US009740947B2

(12) United States Patent
Alyammahi et al.

(10) Patent No.: US 9,740,947 B2
(45) Date of Patent: Aug. 22, 2017

(54) HARDWARE ARCHITECTURE FOR LINEAR-TIME EXTRACTION OF MAXIMALLY STABLE EXTREMAL REGIONS (MSERS)

(71) Applicant: Khalifa University of Science and Technology, Abu Dhabi (AE)

(72) Inventors: Sohailah Mohamed Rashed Alyammahi, Abu Dhabi (AE); Ehab Najeh Salahat, Abu Dhabi (AE); Hani Hasan Mustafa Saleh, Abu Dhabi (AE); Andrzej Stefan Sluzek, Abu Dhabi (AE); Mohammed Ismail Elnaggar, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 0 days.

(21) Appl. No.: 15/277,477

(22) Filed: Sep. 27, 2016

(65) Prior Publication Data

US 2017/0017853 A1 Jan. 19, 2017

Related U.S. Application Data

(63) Continuation-in-part of application No. 14/482,482, filed on Sep. 10, 2014, now Pat. No. 9,489,578.

(51) Int. Cl.

*G06K 9/00* (2006.01)
*G06K 9/46* (2006.01)
*G06K 9/34* (2006.01)

(52) U.S. Cl.

CPC ..... *G06K 9/00986* (2013.01); *G06K 9/00771* (2013.01); *G06K 9/342* (2013.01); *G06K 9/4609* (2013.01)

(58) Field of Classification Search

None

See application file for complete search history.

(56) References Cited

U.S. PATENT DOCUMENTS 7,027,054 B1 * 4/2006 Cheiky .................. H04N 5/262 345/473
7,725,484 B2 * 5/2010 Nister .................. G06K 9/6223 707/706

(Continued)

OTHER PUBLICATIONS

Donoser, M., et al., “Efficient Maximally Stable Extremal Region (MSER) Tracking,” Proceedings of the 2006 IEEE Computer Society Conference on Computer Vision and Pattern Recognition, Jun. 2006, 8 pages.

(Continued)

*Primary Examiner* — Nancy Bitar
(74) *Attorney, Agent, or Firm* — Withrow & Terranova, P.L.L.C.

(57) ABSTRACT

An architecture for linear-time extraction of maximally stable extremal regions (MSERs) having an image memory, heap memory, a pointer array and processing hardware is disclosed. The processing hardware is configured to in real-time analyze image pixels in the image memory using a linear-time algorithm to identify a plurality of components of the image. The processing hardware is also configured to place the image pixels in the heap memory for each of the plurality of components of the image, generate a pointer that points to a location in the heap memory that is associated with a start of flooding for another component and store the pointer in the array of pointers. The processing hardware is also configured to access the plurality of components using the array of pointers and determine MSER ellipses based on the components and MSER criteria.

19 Claims, 5 Drawing Sheets

(56) References Cited

U.S. PATENT DOCUMENTS

| | | | | |
|---|---|---|---|---|
| 1,813,561 | A1 | 10/2010 | Jia et al. | |
| 8,265,866 | B2 | 9/2012 | Altamura et al. | |
| 8,295,604 | B2 | 10/2012 | Sakai et al. | |
| 8,406,532 | B2 | 3/2013 | Wang et al. | |
| 8,538,077 | B2 | 9/2013 | Zitnick, III | |
| 9,053,361 | B2 | 6/2015 | Baheti et al. | |
| 9,311,555 | B2 * | 4/2016 | Salahat | H04N 7/18 |
| 9,489,578 | B2 * | 11/2016 | Salahat | G06K 9/342 |
| 9,600,739 | B2 * | 3/2017 | Salahat | G06K 9/4671 |
| 2014/0286579 | A1 | 9/2014 | Grujic et al. | |
| 2016/0071280 | A1 | 3/2016 | Salahat et al. | |

OTHER PUBLICATIONS

Donoser, M., et al., "Shape Guided Maximally Stable Extremal Region (MSER) Tracking," 20th International Conference on Pattern Recognition, Istanbul, Aug. 2010, pp. 1800-1803.

Greenhalgh, J., et al., "Real-Time Detection and Recognition of Road Traffic Signs," IEEE Transactions on Intelligent Transportation Systems, vol. 13, No. 4, Dec. 2012, pp. 1498-1506.

Hsu G.-S., et al. "Application-Oriented License Plate Recognition," IEEE Transactions of Vehicular Technology, vol. 62, No. 2, Feb. 2013, pp. 552-561.

Huang, L., et al., "Human Skin Detection in Images by MSER Analysis," 18th IEEE International Conference on Image Processing, Brussels, Sep. 2011, pp. 1257-1260.

Kristensen, Fredrik et al., "Real-Time Extraction of Maximally Stable Extremal Regions on an FPGA," 2007 IEEE International Symposium on Circuits and Systems, May 2007, IEEE, pp. 165-168.

Riemenschneider, H., et al., "Online Object Recognition by MSER Trajectories," 19th International Conference on Pattern Recognition, Tampa, FL, Dec. 2008, 4 pages.

Sivic, J., et al., "Video Google: A Text Retrieval Approach to Object Matching in Videos," Proceedings of the Ninth IEEE International Conference on Computer Vision, Nice, France, Oct. 13-16, 2003, 8 pages.

Varah, S., et al., "Target Detection and Tracking Using a Parallel Implementation of Maximally Stable Extremal Region," GPU Technology Conference, Canada, Mar. 2013, 28 pages.

Zamberletti, Alessandro et al., "Text Localization based on Fast Feature Pyramids and Multi-resolution Maximally Stable Extremal Regions," ACCV 2014 Workshops Computer Vision, Springer International Publishing, 2014, pp. 91-105.

Notice of Allowance for U.S. Appl. No. 14/482,629, mailed Nov. 19, 2015, 8 pages.

Non-Final Office Action for U.S. Appl. No. 14/482,482, mailed Jan. 4, 2016, 7 pages.

Notice of Allowance for U.S. Appl. No. 14/482,482, mailed Jul. 8, 2016, 8 pages.

Non-Final Office Action for U.S. Appl. No. 14/686,905, mailed Apr. 21, 2016, 5 pages.

Notice of Allowance for U.S. Appl. No. 14/686,905, mailed Oct. 13, 2016, 7 pages.

* cited by examiner

HARDWARE ARCHITECTURE FOR LINEAR-TIME EXTRACTION OF MAXIMALLY STABLE EXTREMAL REGIONS (MSERS)

RELATED APPLICATIONS

The present application is a continuation-in-part of U.S. patent application Ser. No. 14/482,482, filed Sep. 10, 2014, entitled "HARDWARE ARCHITECTURE FOR REAL-TIME EXTRACTION OF MAXIMALLY STABLE EXTREMAL REGIONS (MSERs)."

The present application is related to U.S. patent application Ser. No. 14/686,905, filed Apr. 15, 2015, entitled "ARCHITECTURE FOR REAL-TIME EXTRACTION OF EXTENDED MAXIMALLY STABLE EXTREMAL REGIONS (X-MSERs)."

All of the applications listed above are hereby incorporated herein by reference in their entireties.

FIELD OF THE DISCLOSURE

The present disclosure relates to computer vision and automated surveillance systems.

BACKGROUND

Visual surveillance of dynamic scenes is an active area of research in robotics and computer vision. The research efforts are primarily directed towards object detection, recognition, and tracking from a video stream. Intelligent visual surveillance has a wide spectrum of promising government and commercially-oriented applications. Some important applications are in the field of security and include access control, crowd control, human detection and recognition, traffic analysis, detection of suspicious behaviors, vehicular tracking, Unmanned Aerial Vehicle (UAV) operation, and detection of military targets. Many other industrial applications in the automation fields also exist, such as faulty products detection, quality assurance, and production line control.

Commercial surveillance systems are intended to report unusual patterns of motion of pedestrians and vehicles in outdoor environments. These semi-automatic systems are further intended to assist, but not replace, the end-user. In addition, electronics companies provide suitable equipment for surveillance. Examples of such equipment include active smart cameras and omnidirectional cameras. All of the above provide evidence of the growing interest in visual surveillance, where, as in many image processing applications, there is a crucial need for high performance real-time systems. A bottleneck of these systems is primarily hardware-related, including capability, scalability, requirements, power consumption, and ability to interface various video formats. In fact, the issue of memory overhead prevents many systems from achieving real-time performance, especially when general purpose processors are used. In these situations, the typical solutions are either to scale down the resolution of the video frames or to inadequately process smaller regions of interests within the frame.

Although Digital Signal Processors (DSPs) provide improvement over general purpose processors due to the availability of optimized DSP libraries, DSPs still suffer from limited execution speeds. Thus, DSPs are insufficient for real-time applications. Field programmable gate array (FPGA) platforms, on the other hand, with their inherently parallel digital signal processing blocks, large numbers of embedded memory and registers, and high speed memory, together with storage interfaces, offer an attractive solution to facilitate hardware realization of many image detection and object recognition algorithms. As a result, computationally expensive algorithms are usually implemented on an FPGA.

State of the art developments in computer vision confirm that processing algorithms will make a substantial contribution to video analysis in the near future. Once commercialized, the processing algorithms may overcome most of the issues associated with the power and memory demanding needs. However, the challenge to devise, implement, and deploy automatic systems using such algorithms to detect, track, and interpret moving objects in real-time remains. The need for real-time applications is strongly felt worldwide, by private companies and governments directed to fight terrorism and crime, and to provide efficient management of public facilities.

Intelligent computer vision systems demand novel system architectures capable of integrating and combining computer vision algorithms into configurable, scalable, and transparent systems. Such systems inherently require high performance devices. However, many uncharted areas remain unaddressed. For example, only a single hardware implementation attempt has been reported for a Maximally Stable Extremal Regions (MSERs) detector and that attempt was met with limited success. This is despite the fact that MSERs detectors were introduced as a research topic more than a decade ago, have been used in numerous software applications, and been discussed in over 3,000 published papers. The major advantages of MSERs are affine invariance. Traditional scale invariant feature transform (SIFT) detectors and speeded up robust features (SURF) detectors are only scale and rotation invariant.

Moreover, classical MSER and SIFT algorithms tend to be far more computationally complicated than a linear-time MSERs algorithm. For example, one of the preprocessing steps for SIFT detection is the construction of the Scale-Space using the Pyramid of Gaussian. In this step, multiple versions of the scaled input frame are stored to be used later for the SIFT detection. This requires additional memory space as compared to storing one single version of the input frame to be processed directly via the linear-time MSERs algorithm. Additionally, each of these scaled versions of the input framed are filtered (convolved) with a smoothing filter, the SIFT inventor, which means extra processing (additions, multiplication, and memory read/write accesses) are required, and hence more power will be consumed. In the case of linear-time MSER, the extra processing steps are not necessary.

What is needed is a hardware architecture for linear-time extraction of MSERs. The architecture can be easily realized with e.g. an FPGA or an application specific integrated circuit (ASIC) or the like.

SUMMARY

An architecture for linear-time extraction of maximally stable extremal regions (MSERs) having an image memory, heap memory, a pointer array and processing hardware is disclosed. The processing hardware is configured to, in real-time, analyze image pixels in the image memory using a linear-time MSERs algorithm to identify a plurality of components of the image. The processing hardware is also configured to place the image pixels in the heap memory for each of the plurality of components of the image, generate a pointer that points to a location in the heap memory that is associated with a start of flooding for another component and store the pointer in the array of pointers. The processing hardware is also configured to access the plurality of components using the array of pointers and determine MSER ellipses based on the components and MSER criteria.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 1:
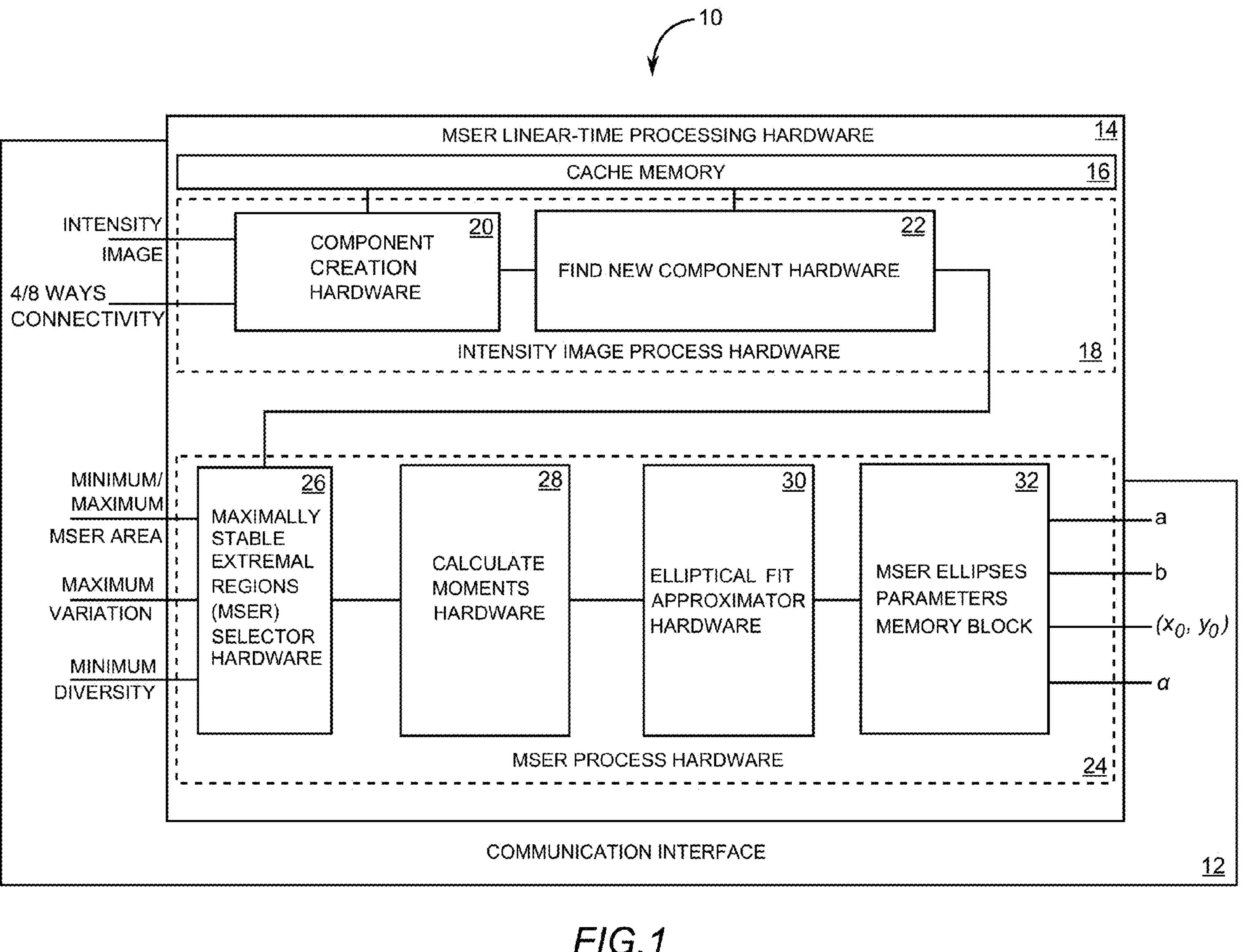
FIG. 1 is a block diagram of an architecture for linear-time extraction of maximally stable extremal regions (MSERs) that is in accordance with the present disclosure.

FIG. 1 is a block diagram of an architecture 10 for linear-time extraction of maximally stable extremal regions (MSERs). The architecture 10 includes a communication interface 12 and MSER linear-time processing hardware 14. In an exemplary embodiment, a cache memory 16 is usable to store data resulting from MSER processing performed by the MSER linear-time processing hardware 14. For the purpose of this disclosure, the architecture 10 combines the required electronic circuits of various hardware implemented functions and memory needed to realize the architecture 10 onto a single integrated chip (IC) as a complete system. The architecture 10 is realized on a (System-on-Chip) SoC, a field programmable gate array (FPGA), an application specific integrated circuit (ASIC) or the like.

The MSER linear-time processing hardware 14 includes intensity image process hardware 18 that receives a data stream of an intensity image via the communications interface 12. The intensity image process hardware 18 includes component creation hardware 20 and find new component hardware 22 that creates, finds, and merges components associated with the intensity image, and then passes the components on MSER process hardware 24.

The MSER process hardware 24 includes MSER selector hardware 26 that receives MSER criteria that uses the components to select MSERs. MSERS that are selected have moments calculated by calculate moments hardware 28. The moments are used by elliptical fit approximator hardware 30 to generate ellipse parameters that are stored in an MSER ellipses parameters memory block 32.

Figure 2:
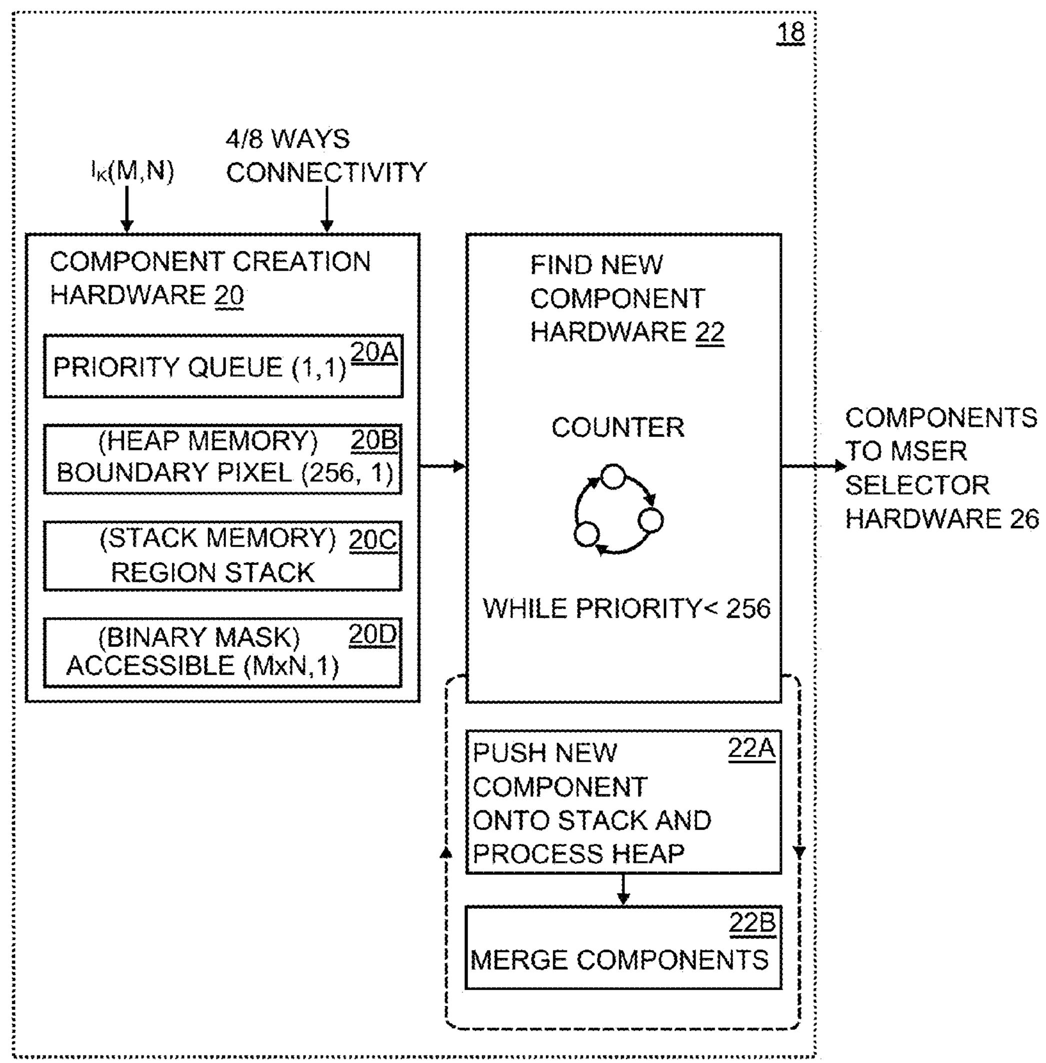
FIG. 2 is a block diagram for an embodiment of the architecture for linear-time extraction of MSERs that provides detail for component creation hardware.

FIG. 2 is a block diagram for an embodiment of the architecture 10 for linear-time extraction of MSERs that provides detail for the component creation hardware 20 and the find new component hardware 22. In order to realize a flood-filling of the linear-time MSERs algorithm, assigned memory locations are employed. A memory location known as a priority queue 20A maintains a priority value that is pixel intensity (i.e., grey level). In at least one embodiment, a highest priority value is 255. Therefore, a priority value less than 256 indicates that the find new component hardware 22 is not finished finding components.

A heap memory 20B has columns equal to the number of grey levels. For an unsigned 8-bit image, there are 256 grey levels (0-255). The first column corresponds to level 0 and the last column to level 255. All pixels that are accessed but not yet flooded are stored in this memory. The first element in each column is used as a pointer to the last element in that column. Initially, the pointer points to the second location in a column. The pointer's value is incremented when a new element is added while its value is decremented when an element is popped out. Feature 22A pushes a new component onto the stack and processes the heap while feature 22B merges components.

A stack memory 22C of the same size as an input image is used to store a sequence of pixels that are flooded. The stack memory can be considered a memory block that stores a water path during flooding.

A binary mask 20D has the same dimension as input image wherein each bit of the binary mask 20D is used to determine the state of a corresponding pixel. The state of the corresponding pixel indicates whether or not the corresponding pixel has been accessed by water or not. Initially, all pixel values are set to be true, indicating that these pixels are accessible. In the exemplary embodiments of this disclosure, a true condition is represented by a logic 1 and a false condition is represented by a logic 0.

Figure 3:
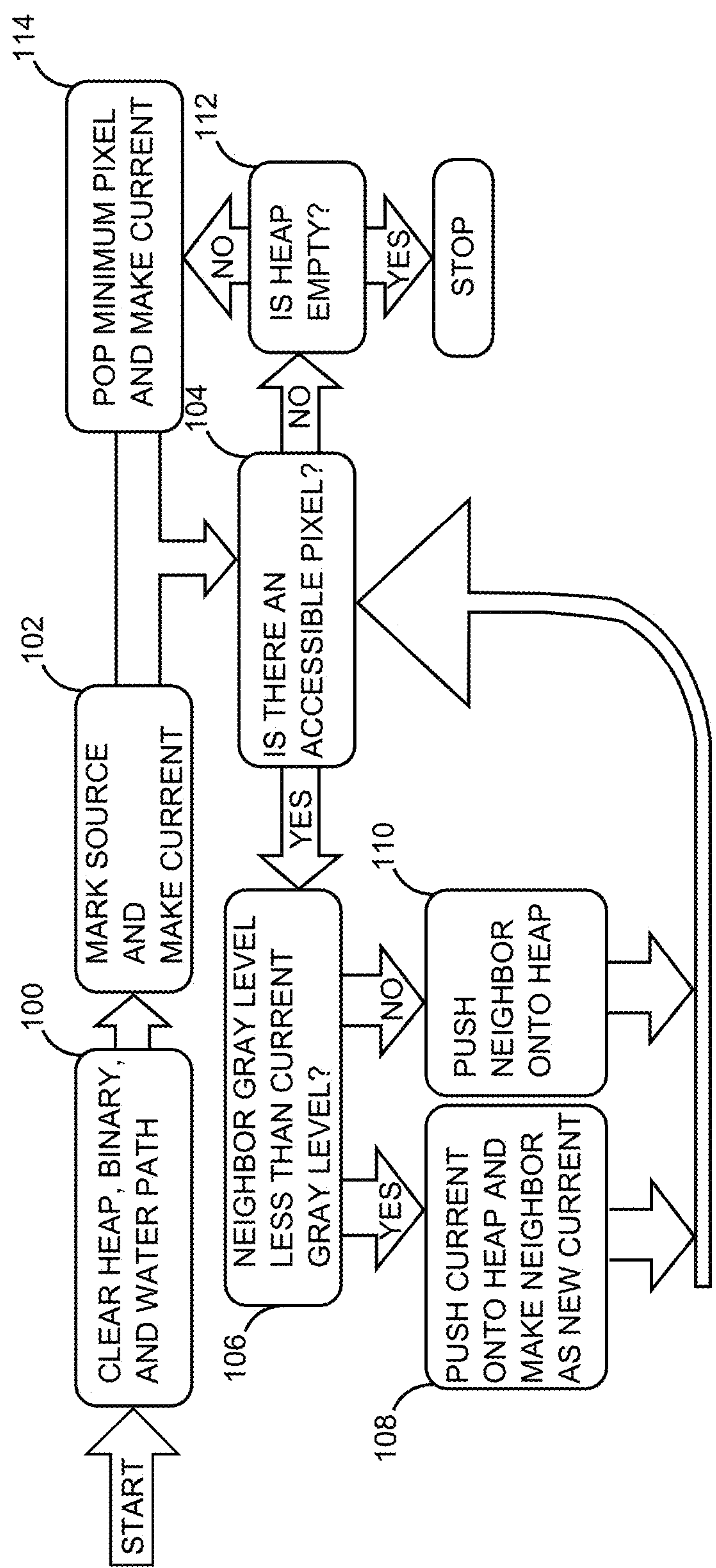
FIG. 3 is a flowchart for a flooding process executed by the component creation hardware and the find new component hardware that communicates with the component creation hardware.

FIG. 3 is a flowchart for the flooding process executed by the component creation hardware 20 and the find new component hardware 22 that communicates with the component creation hardware 20. The flooding process comprising the linear-time MSERs algorithm starts by clearing heap memory 20B, a binary mask, and a matrix to store flooding sequence (step 100). Next, a source pixel is set as the current pixel, and a binary mask value of the source pixel is set to 0 along with grey level for the source pixel, which is stored as "current grey level" (step 102). Then, the neighbors of the current pixel are searched using a process known as 4-connectivity that examines the properties of four pixels that are adjacent to the current pixel. If an index of a neighbor pixel is valid, a binary mask for the neighbor value is set to a logic 1 and marked as accessible (step 104). A grey level of this neighbor pixel is stored as "grey level neighbor" and is compared with "current grey level" (step 106). If "neighbor grey level" is lower than "current grey level", the neighbor pixel is selected as the current pixel and the previous current pixel is pushed onto the heap memory 20B and the flooding process returns to step 104 (step 108). However, if "neighbor grey level" is not lower than "current grey level", the neighbor is pushed onto the heap memory 20B and the flooding process returns to step 104 (step 110). If all neighbors are accessed, the binary mask value of the current pixel is set to logic 0, and the current pixel is added to a flooding path stack. At this point, a check is made to determine if the heap memory 20B is empty (step 112). The flooding process comes to a stop if either the heap memory 20B is empty or elements pushed onto the heap memory 20B are equal to the elements popped from the heap memory 20B. If the heap memory 20B is not empty, a pixel of the minimum grey level value is popped from the heap memory 20B and is set as the current pixel (step 114). The flooding process returns to step 104 and continues until the heap memory 20B is empty.

Figure 4:
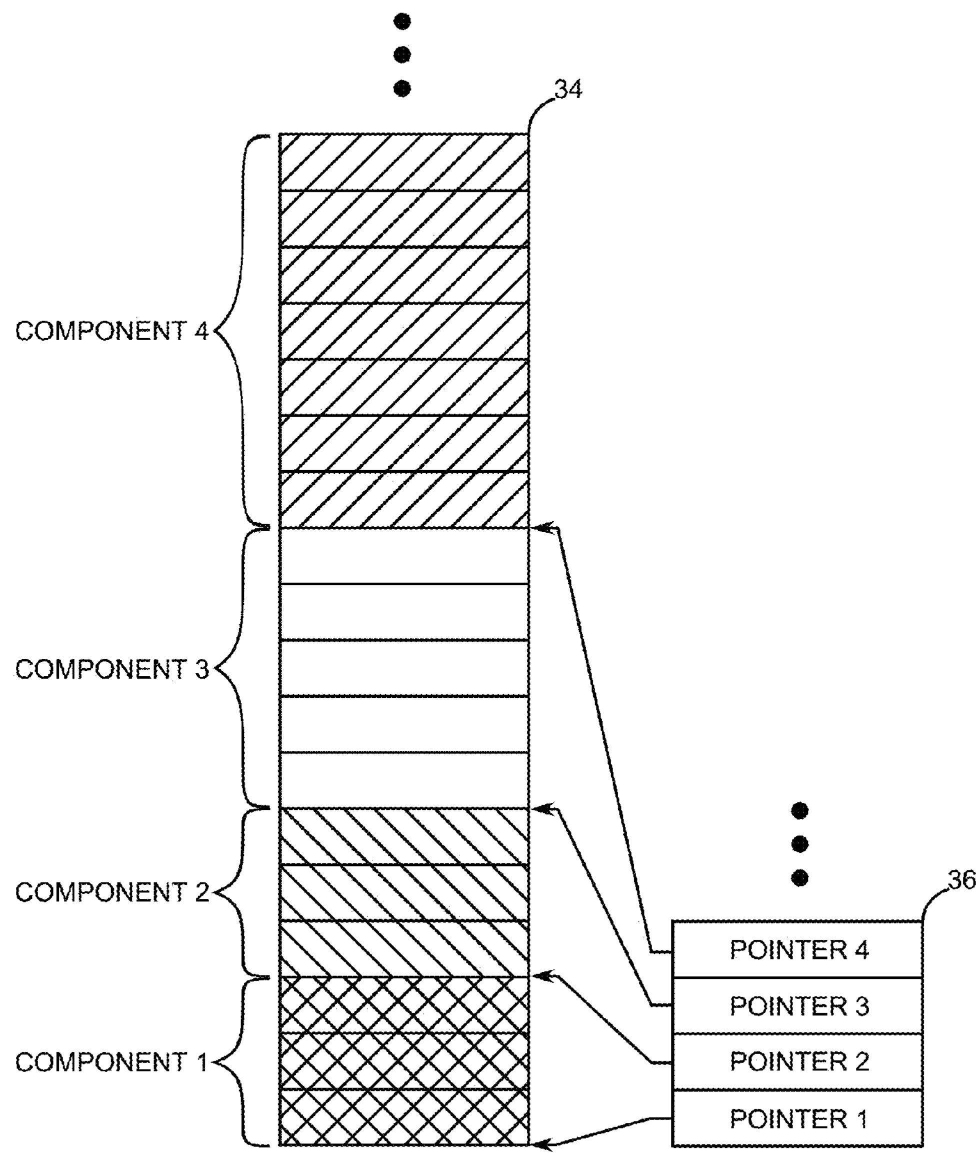
FIG. 4 is memory diagram of a data structure for the heap memory (FIG. 2) and an associated pointer array.

FIG. 4 is a memory diagram of a data structure 34 for the heap memory 20B (FIG. 2) and an associated array of pointers 36. The data structure 34 is relatively very memory efficient as it saves 90% of the memory requirements of the original linear-time MSERs algorithm. As a result, the MSER linear-time processing hardware 14 is suitable for small and mobile devices and fits large-scale image retrieval tasks, and allows a wide spectrum of potential real-time applications to be realized. In particular, the MSER linear-time processing hardware 14 is configured to place image pixels in the heap memory 20B for each of a plurality of components of the image, generate a pointer that points to a location in the heap memory 20B that is associated with a start of flooding for another component and store the pointer in the array of pointers 36. The MSER linear-time processing hardware 14 is also configured to access the plurality of components using the array of pointers and determine MSER ellipses based on the components and MSER criteria.

Returning to FIG. 1, the communication interface 12 receives MSER critera that in at least one embodiment includes a minimum MSER area value MinArea, a maximum MSER area value MaxArea, and a maximum variation value MaxVar. The minimum MSER area is the minimum number of pixels that an MSER can contain. In contrast, the maximum MSER area is the maximum number of pixels that an MSER can contain.

The communication interface 12 passes the MSER criteria to MSER selector hardware 26, which also receives MSERs found via the find new component hardware 22. The MSER selector hardware 26 in turn tests each MSER to ensure that each MSER has an area that fits within the range specified by the minimum MSER area value MinArea and the maximum MSER area value MaxArea.

The maximum variation value MaxVar specifies how stable the detected MSERs must be. The communication interface 12 passes maximum variation value MaxVar to the MSER selector hardware 26, which in turn tests each component found by the find new component hardware 22 to ensure that each component does not exceed the maximum variation value MaxVar.

In one embodiment, the MSER criteria also include a minimum diversity value $\tau$ that is provided to mitigate sensitivity to blur and to mitigate discretization effects that plague traditional MSER extraction software and/or hardware. Since nested MSERs have similar center coordinates, any new MSERs with centers within a range associated with the minimum diversity value $\tau$ compared to previously detected and stored MSERs are excluded automatically. In particular, all detected MSERs satisfy the following conditions:

$$x_0 :\notin \{(1-0.5\tau)x_i, (1+0.5\tau)x_i\}, \quad \text{EQ. 1}$$

$$y_0 :\notin \{(1-0.5\tau)y_i, (1+0.5\tau)y_i\}, \quad \text{EQ. 2}$$

where $x_i$ and $y_i$ denote all previously stored center values of the detected MSERs. However, comparing centers has a drawback in that unnecessary computations are included while image moments are calculated. In order to predict possible nesting, and hence save unnecessary operations due to comparing centers, an alternative approach is executed by the MSER selector hardware 26 at a relatively far lower computational cost. Specifically, for each region, the MSER selector hardware 26 compares a current growth rate with a previous growth rate, and if an absolute difference is within a range defined by the minimum diversity value $\tau$, then this region at the current intensity threshold is excluded by the MSER selector hardware from further MSER extraction processing.

Figure 5:
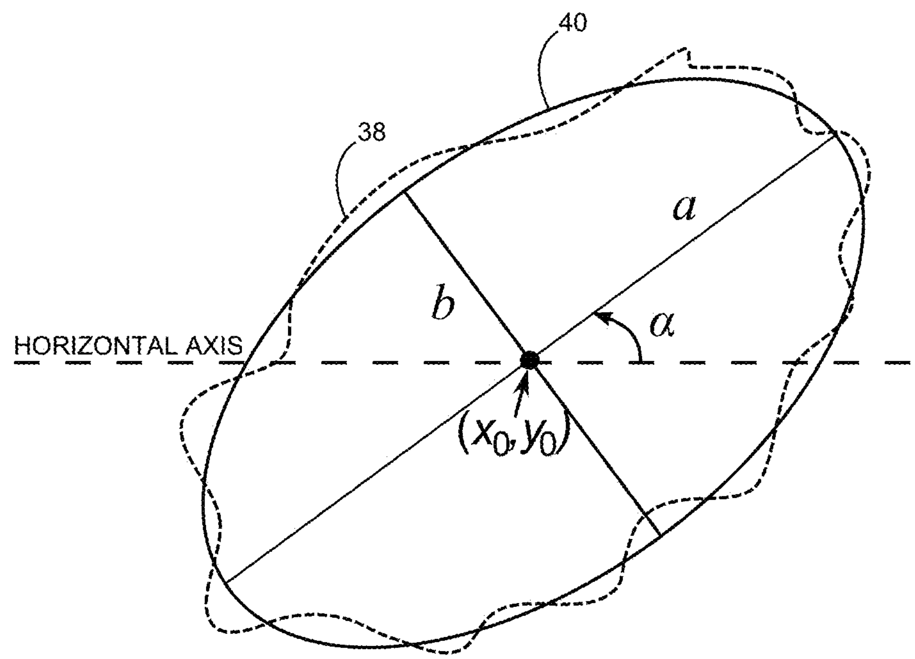
FIG. 5 is an exemplary contour sketch of an irregularly-shaped MSER with a best-fit elliptical approximation.

FIG. 5 is an exemplary contour sketch of an irregularly shaped MSER 38 with a best-fit elliptical approximation 40. Note that since merging regions will cause the same region sizes to be stored for multiple seeds, multiple detections referring to the same MSER may occur. To avoid this, only the first seed for the merged regions is used by the MSER process hardware 24 during operation, as discussed above. execution time.

MSER calculate moments hardware 28 uses a pixel list to calculate region moments using the following relationship for any particular moment $m_{pq}$.

$$m_{pq} = \Sigma_{(x,y)\in R} x^p y^q, \quad \text{EQ. 3}$$

$$x,y \in R(\tau) \quad \text{EQ. 4}$$

where x and y denote the pixel coordinate of the region $R(\tau)$ at the current intensity threshold. Subsequently, the region can be approximated by a best-fit ellipse equation that is given by:

$$\frac{(x - x_0 + \tan(\alpha)(y - y_0))^2}{a^2(1 + \tan^2(\alpha))} + \frac{(y - y_0 + \tan(\alpha)(x - x_0))^2}{b^2(1 + \tan^2(\alpha))} = 1, \quad \text{EQ. 5}$$

where $(x_0, y_0)$, a, b, and $\alpha$, respectively, are MSER ellipse parameters that represent a center of gravity (center of the MSER ellipse), a major axis length, a minor axis length, and an angle of the major axis with respect to a horizontal axis. In an exemplary embodiment, the MSER ellipse parameters are determinable using region moments $m_{00}$, $m_{10}$, $m_{10}$, $m_{11}$, $m_{02}$, and $m_{20}$ that are calculated by MSER calculate moments hardware 28. Elliptical fit approximator hardware 30 uses the region moments provided by the MSER calculate moments hardware 28 to approximate the MSER ellipse parameters $(x_0, y_0)$, a b, and $\alpha$ via the following mathematical relationships.

$$x_0 = \frac{m_{10}}{m_{00}}, \quad \text{EQ. 6}$$

$$y_0 = \frac{m_{01}}{m_{00}}, \quad \text{EQ. 7}$$

$$a = \sqrt{2\left(t_1 + t_3 + \sqrt{t_2^2 + (t_3 - t_1)^2}\right)}, \quad \text{EQ. 8}$$

$$b = \sqrt{2\left(t_1 + t_3 - \sqrt{t_2^2 + (t_3 - t_1)^2}\right)}, \quad \text{EQ. 9}$$

$$\alpha = 0.5\tan^{-1}\left(\frac{t_2}{t_1 - t_3}\right), \quad \text{EQ. 10}$$

-continued where $$t_1 = \frac{m_{20}}{m_{00}} - x_0^2, \quad \text{EQ. 11}$$

$$t_2 = 2\left(\frac{m_{11}}{m_{00}} - x_0 y_0\right), \quad \text{EQ. 12}$$

$$t_3 = \frac{m_{02}}{m_{00}} - y_0^2, \quad \text{EQ. 13}$$

Instead of storing each MSER pixels list, which would require a relatively huge memory, the MSER ellipses parameters memory block 32 is usable to store best-fit ellipses parameters ($x_0$, $y_0$), a, b, and $\alpha$, which are provided to external hardware (not shown) for display or monitoring. For example, since the best-fit ellipses parameters ($x_0$, $y_0$), a, b, and $\alpha$ are readily available through the communication interface 12, they can be used to compute scale invariant feature transform (SIFT) descriptors and speeded up robust features (SURF) descriptors.

The MSER calculate moments hardware 28 calculates the region moments $m_{00}$, $m_{10}$, $m_{10}$, $m_{11}$, $m_{02}$, and $m_{20}$ that are stored in a 5×1 memory array stored in the cache memory 16 (FIG. 1). Next, the elliptical fit approximation hardware 30 implements calculate ellipses fit parameters that includes best-fit ellipses parameters ($x_0$, $y_0$), a, b, and $\alpha$, which are stored in the MSER ellipses parameters memory block 32.

Figure 6:
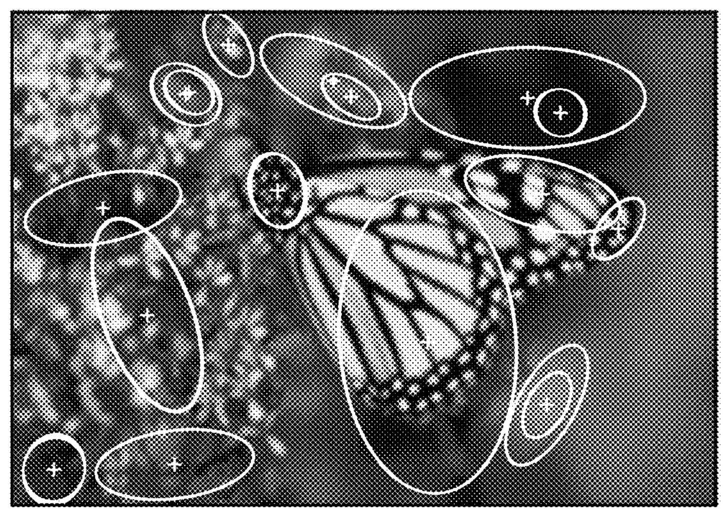
FIG. 6 is a test image displaying ellipses for MSERs detected and extracted from the test image processed by the architecture for linear-time extraction of MSERs.

FIG. 6 is a test intensity image displaying a sample of MSERs that were detected by the architecture 10 of the present disclosure. The MSERs are contained or mostly contained within the white ellipses. Note that some of the MSERs are nested and are represented by ellipses within other ellipses. Crosshairs designate the center of each ellipse. Some nested MSERs are represented by concentric ellipses. It is to be understood that the number of ellipses representing MSERs in FIG. 5 are relatively few only for the purpose of simplified illustration. Relatively many more MSERs are typically detectable during operation of the architecture 10.

Those skilled in the art will recognize improvements and modifications to the embodiments of the present disclosure. All such improvements and modifications are considered within the scope of the concepts disclosed herein and the claims that follow.

What is claimed is:

1. An architecture for linear-time extraction of maximally stable extremal regions (MSERs) comprising:

image memory;

heap memory;

an array of pointers, wherein a total memory size for the image memory, the heap memory, and the array of pointers is equal to $\{3.125 + \{LOG_2(M \times N)\}\} \times M \times N$ where M and N are both finite positive integers; and processing hardware configured to in real-time:

analyze image pixels in the image memory using a linear-time algorithm to identify a plurality of components of an image;

place the image pixels in the heap memory for each of the plurality of components of the image:

generate a pointer that points to a location in the heap memory that is associated with a start of flooding for another component; and store the pointer in the array of pointers;

access the plurality of components using the array of pointers; and determine MSER ellipses based on the plurality of components and MSER criteria.

2. The architecture of claim 1 wherein the MSER criteria include a minimum diversity value.

3. The architecture of claim 2 wherein the MSER criteria further include a minimum MSER area, a maximum MSER area, and a maximum variation value for MSER area.

4. The architecture of claim 1 wherein parameters of the MSER ellipses include a center of gravity, a major axis length, a minor axis length, and an angle of the major axis length with respect to a horizontal axis.

5. The architecture of claim 1 wherein the processing hardware includes MSER moments calculator hardware configured to calculate MSER moments.

6. The architecture of claim 5 wherein the processing hardware further includes elliptical fit approximator hardware configured to receive MSER moments from the MSER moments calculator hardware and fit an MSER ellipse to an extremal region based upon the MSER moments.

7. The architecture of claim 1 wherein the processing hardware includes MSER selector hardware configured to automatically select MSERs based upon the MSER criteria.

8. The architecture of claim 1 further including a communications interface configured to receive a data stream containing the image pixels and store the image pixels in the image memory.

9. The architecture of claim 1 wherein the processing hardware is fabricated on a single application specific integrated circuit (ASIC).

10. The architecture of claim 1 wherein the processing hardware is implemented on a single field programmable gate array (FPGA).

11. A method for linear-time extraction of MSERs via processing hardware comprising:

analyzing image pixels stored in an image memory using a linear-time algorithm to identify a plurality of components of the image;

placing the image pixels in a heap memory for each of the plurality of components of the image:

generate a pointer that points to a location in the heap memory that is associated with a start of flooding for another component; and store the pointer in an array of pointers;

access the plurality of components using the array of pointers; and determine MSER ellipses based on the plurality of components and MSER criteria, wherein a total memory size for the image memory, the heap memory, and the array of pointers is equal to $\{3.125 + \{LOG_2(M \times N)\}\} \times M \times N$ where M and N are both finite positive integers.

12. The method for linear-time extraction of MSERs via processing hardware of claim 11 wherein the MSER criteria include a minimum diversity value.

13. The method for linear-time extraction of MSERs via processing hardware of claim 11 wherein the MSER criteria further include a minimum MSER area, a maximum MSER area, and a maximum variation value for MSER area.

14. The method for linear-time extraction of MSERs via processing hardware of claim 11 wherein parameters for the MSER ellipses include a center of gravity, a major axis length, a minor axis length, and an angle of the major axis length with respect to a horizontal axis.

15. The method for linear-time extraction of MSERs via processing hardware of claim 11 wherein the processing hardware includes MSER moments calculator hardware configured to calculate MSER moments.

16. The method for linear-time extraction of MSERs via processing hardware of claim 15 wherein the processing hardware further includes elliptical fit approximator hardware configured to receive MSER moments from the MSER moments calculator hardware and fit an MSER ellipse to an extremal region based upon the MSER moments.

17. The method for linear-time extraction of MSERs via processing hardware of claim 11 wherein the processing hardware includes MSER selector hardware configured to automatically select MSERs based upon the MSER criteria.

18. The method for linear-time extraction of MSERs via processing hardware of claim 11 wherein the processing hardware is fabricated on a single application specific integrated circuit (ASIC).

19. The method for linear-time extraction of MSERs via processing hardware of claim 11 wherein the processing hardware is implemented on a single field programmable gate array (FPGA).

* * * * *